US012761705B2

(12) United States Patent
Gao

(10) Patent No.: US 12,761,705 B2
(45) Date of Patent: Oct. 13, 2026

(54) ELECTRONIC DEVICE AND ELECTRONIC SYSTEM WITH INTERFACE ON PROTRUSION STRUCTURE OF DISPLAY DEVICE

(71) Applicant: Lenovo (Beijing) Limited, Beijing (CN)

(72) Inventor: Xiaoju Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 395 days.

(21) Appl. No.: 18/492,031

(22) Filed: Oct. 23, 2023

(65) Prior Publication Data

US 2024/0160256 A1 May 16, 2024

(30) Foreign Application Priority Data

Nov. 15, 2022 (CN) ......................... 202211425211.0

(51) Int. Cl.
*G06F 1/16* (2006.01)

(52) U.S. Cl.
CPC .......... *G06F 1/1683* (2013.01); *G06F 1/1605* (2013.01); *G06F 1/1656* (2013.01)

(58) Field of Classification Search
CPC .... G06F 1/1683; G06F 1/1656; G06F 1/1686; G06F 1/1605; G06F 1/1684; G06F 11/3051; G06F 13/10
See application file for complete search history.

(56) References Cited

U.S. PATENT DOCUMENTS 5,488,558 A * 1/1996 Ohki .................. G06F 15/0283 348/E5.025
2003/0137805 A1* 7/2003 Wu ....................... G06F 1/1637 361/679.41

* cited by examiner

*Primary Examiner* — James Wu
(74) *Attorney, Agent, or Firm* — ANOVA LAW GROUP, PLLC

(57) ABSTRACT

An electronic device includes a first body including a first side and a second side opposite to each other, a first interface disposed at the first body and configured to electrically connect to a first external device, a display device disposed at the first body and exposed through the second side, a second body connected to the first body through a connection device and configured to move relative to the first body, and a second interface disposed at the second body and configured to electrically connect to a second external device.

16 Claims, 9 Drawing Sheets

ELECTRONIC DEVICE AND ELECTRONIC SYSTEM WITH INTERFACE ON PROTRUSION STRUCTURE OF DISPLAY DEVICE

CROSS-REFERENCE TO RELATED APPLICATION

This application claims priority to Chinese Patent Application No. 202211425211.0, filed on Nov. 15, 2022, the entire content of which is incorporated herein by reference.

TECHNICAL FIELD

The present disclosure generally relates to the field of electronic device technologies and, more particularly, to an electronic device and an electronic system.

BACKGROUND

With the continuous development of science and technology, more and more electronic devices are widely used in people's daily life and work, bringing great convenience to people's daily life and work, and becoming indispensable and important tools for people today.

Generally, most electronic devices are equipped with interfaces for connecting external devices to expand more functions. For an electronic device with two bodies that are foldable with respect to each other, interfaces for connecting external devices are generally provided on the same body.

SUMMARY

In accordance with the present disclosure, there is provided an electronic device including a first body including a first side and a second side opposite to each other, a first interface disposed at the first body and configured to electrically connect to a first external device, a display device disposed at the first body and exposed through the second side, a second body connected to the first body through a connection device and configured to move relative to the first body, and a second interface disposed at the second body and configured to electrically connect to a second external device.

In accordance with the present disclosure, there is also provided an electronic system including an electronic device and first and/or second external device. The electronic device includes a first body including a first side and a second side opposite to each other, a first interface disposed at the first body configured to connect to the first external device, a display device disposed at the first body and exposed through the second side, a second body connected to the first body through a connection device and configured to move relative to the first body, and a second interface disposed at the second body and configured to connect to the second external device.

DETAILED DESCRIPTION OF THE EMBODIMENTS

Figure 1:
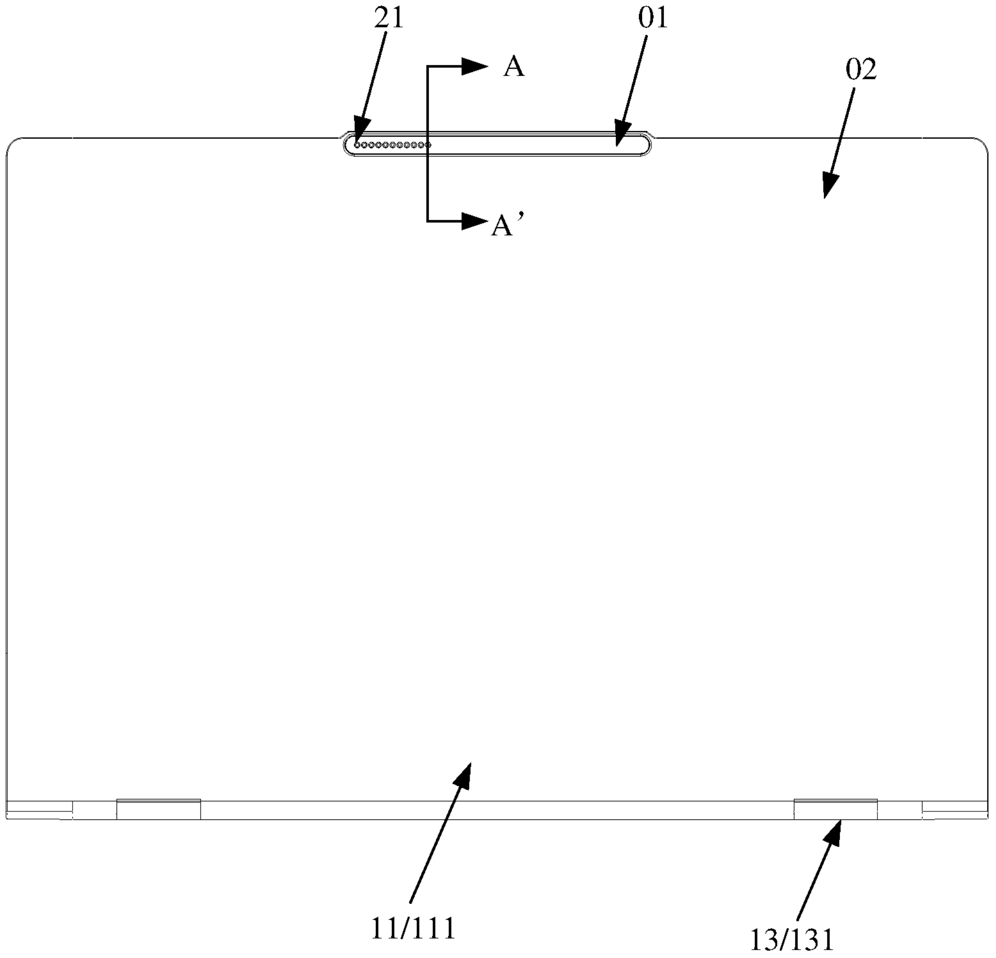
FIG. 1 is an external top view of a first body of an electronic device consistent with the present disclosure.

Hereinafter, embodiments and features consistent with the present disclosure will be described with reference to drawings. Various modifications may be made to the embodiments of the present disclosure. Thus, the described embodiments should not be regarded as limiting, but are merely examples. Those skilled in the art will envision other modifications within the scope and spirit of the present disclosure. The accompanying drawings, which are incorporated in and constitute a part of this specification, illustrate embodiments of the present disclosure and, together with the general description of the present disclosure above and the detailed description of the embodiments below, serve to explain the principle of the present disclosure.

These and other features of the present disclosure will become apparent from the following description of non-limiting embodiments with reference to the accompanying drawings. Although the present disclosure is described with reference to some specific examples, those skilled in the art will be able to realize many other equivalents of the present disclosure. The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for, the claims and a representative basis for teaching one skilled in the art to variously employ the present disclosure in substantially any suitable detailed structure. In the present disclosure, the phrases such as "in one embodiment," "in another embodiment," "in yet another embodiment," or "in other embodiments," may all refer to one or more of different embodiments in accordance with the present disclosure.

For an electronic device with two relatively foldable bodies, e.g., two bodies that can fold with respect to each other, interfaces for connecting external devices are generally provided on one same body. The number of interfaces that can be set on the same body is limited, making it inconvenient for the electronic device to connect more external devices for function expansion.

Taking a laptop computer as an example, two relatively foldable bodies of the laptop computer include a display body and a keyboard body. In the laptop computers in existing technologies, a plurality of interfaces are generally provided on the keyboard body. The plurality of interfaces includes one or more of USB interfaces, network interfaces, multimedia interfaces, or audio interfaces.

The present disclosure provides an electronic device to at least partially alleviate the above problem. In the present disclosure, the electronic device may include a first body and a second body that are able to be relatively rotated and/or folded. The first body may be provided with a first interface for electrically connecting a first external device. The second body may be provided with a second interface for electrically connecting second external devices.

In the electronic device provided by the present disclosure, the first interface and the second interface may be respectively provided on the first body and the second body to electrically connect the first external device and the second external devices respectively. Therefore, a larger number of interfaces may be provided on the electronic device.

In one embodiment, the electronic device may be a laptop computer. In some other embodiments, the electronic device may include a flexible display device having a first display portion, a second display portion, and a bendable display portion located between the first display portion and the second display portion. The first display portion and the second display portion may serve as the first body and the second body respectively. The first display portion and the second display portion may be folded based on the flexible display portion to change their relative angles. The present disclosure has no limit on the type of the electronic device.

Figure 2:
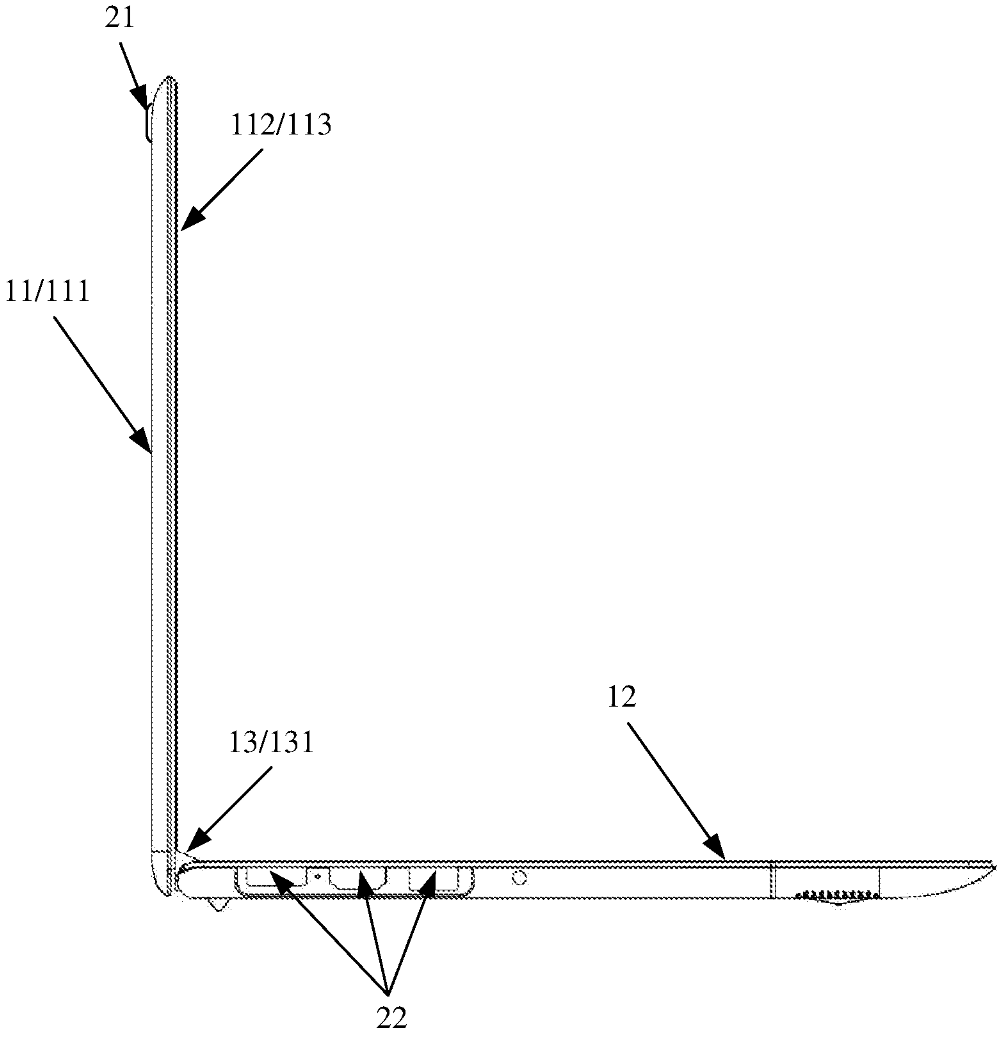
FIG. 2 is a side view of an electronic device consistent with the present disclosure.

One embodiment of the present disclosure provides an electronic device. As shown in FIG. 1 which is an external top view of a first body of the electronic device and FIG. 2 which is a side view of the electronic device, in the present embodiment, the electronic device includes:

- a first body 11 including a first side 111 and a second side 112 opposite to each other;
- a first interface 21 disposed on the first body 11 for electrically connecting to a first external device;
- a display device 113 disposed on the first body 11 and exposed through the second side 112, for outputting display content to achieve image display;
- a second body 12 connected to the first body 11 through a connection device 13 and capable of moving relative to the first body 11; and
- a second interface 22 disposed on the second body 12 for electrically connecting to second external devices.

In the electronic device provided by the present embodiment, the first interface 21 and the second interface 22 may be respectively provided on the first body 11 and the second body 12 to electrically connect the first external device and the second external devices respectively. Therefore, a larger number of interfaces may be provided on the electronic device.

The first body 11 may have a first end and a second end opposite to each other. The first end may be rotatably connected to one end of the second body 12 through a first connection device 131. The first interface 21 may be provided on the second end and may be exposed through the first side 111. In one embodiment shown in FIG. 1 and FIG. 2, the first end of the first body 11 may be the lower end of the first body 11 in the figure, and the second end of the first body 11 may be the upper end of the first body 11 in the figure.

The connection device 13 includes the first connection device 131. The first connection device 131 may be a rotating shaft connection device or a hinge connection device, which is not specifically limited in the embodiments of the present disclosure. The opening angle between the first body 11 and the second body 12 may be changed based on the first connection device 131. The first body 11 and the second body 12 may at least be able to switch from a closed state (the first body 11 and the second body 12 are at an included angle of 0° as shown in FIG. 1) to a flat state (the first body 11 and the second body 12 are in a 180° coplanar state). By arranging the structure of the first connection device 131, the opening and closing angle range between the first body 11 and the second body 12 may be achieved. In some other embodiments, the first body 11 and the second body 12 may be able to change the relative opening/closing angle from the closed state to an included angle of 360°.

The first interface 21 may be disposed at the second end of the first body 11 and away from the first connection device 131. Therefore, when the first body 11 and the second body 12 are opened at a set angle to be used as a laptop computer, there may be enough space to electrically connect the first external device through the first interface 21 on the first body.

Figure 3:
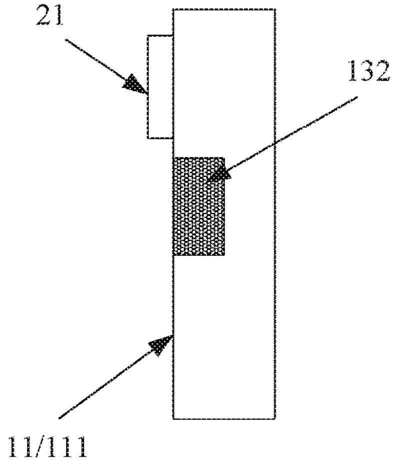
FIG. 3 is a schematic structural diagram of an electronic device consistent with the present disclosure.

In another embodiment shown in FIG. 3, which is a schematic structural diagram of another electronic device consistent with the present disclosure, the first body 11 may further include a second connection device 132. The second connection device 132 may be used to detachably fix the first external device. The first external device may be fixed on the electronic device through the second connection device 132, and the first interface 21 may be electrically connected to the first external device.

The electronic device may attract and fix the first external device based on the magnetic force between the second connection device 132 and the first external device.

In one embodiment, the second connection device 132 may be a magnet provided in the first body 11, and the first external device may have metal shells.

In another embodiment, the first external device may be provided with magnets inside, and the first body 11 may have a metal shell used as the second connection device 132.

In another embodiment, the second connection device 132 may be a magnet provided in the first body 11, and another magnet is provided in each first external device of the first external device, and the polarities of the opposite ends of the two magnets may be opposite. Therefore, when the first external device is close to the first interface 21, magnetic attraction may be generated based on the opposite polarity between the two magnets.

The embodiment shown in FIG. 3 where the second connection device 132 is a magnet in the first body 11 is used as an example to illustrate the present disclosure.

Figure 4:
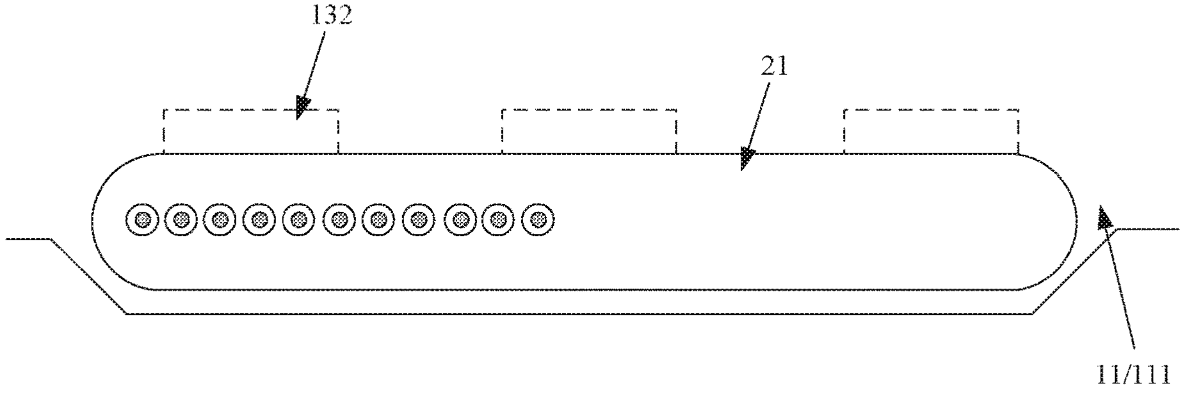
FIG. 4 is an arrangement of a second connection device in a first body consistent with the present disclosure.

In one embodiment shown in FIG. 4 which is an arrangement of the second connection device in the first body from top view of the first side 111 of the first body 11, three magnets may be disposed at the first body 11 as the second connection device 132. In FIG. 4, the magnets located in the first body 11 are represented by dotted boxes.

In the present embodiment, the electronic device may be able to attract and fix the first external device based on the magnetic force between the second connection device 132 and the first external device, such that the first external device may be subject to the magnetic attraction pointing from the first side 111 to the second side 112. Correspondingly, the reliability of the electrical connection between the first external device and the first interfaces 21 may be ensured, and also the stability of the fixture of the electronic device and the first external device may be ensured.

Further, in some embodiments, one first external device may be hung above the second end through an external mechanical structure in the first external device, such that the first external device may receive a support force directed from the first end to the second end. Therefore, the first body 11 may provide supporting force for the first external device to ensure the stability of the first external device hanging on the first body 11.

Figure 5A:
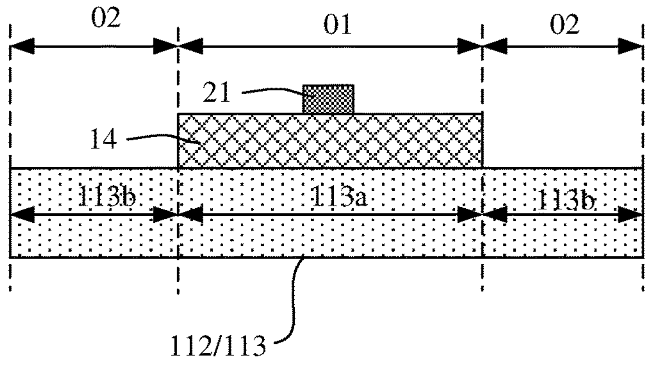
FIG. 5A is a cross-sectional view of a first body along an A-A' direction consistent with the present disclosure.

In one embodiment shown in FIG. 5A, which is a cross-sectional view of the first body along the A-A' direction, in conjunction with FIG. 1, the first body 11 may include a first part 01 and a second part 02. The first part 01 may include: a first sub-part 113*a* of the display device 113; a first circuit daughterboard 14 on a side of the first sub-part 113*a* of the display device 113 facing away from the light-emitting side, and the first interface 21 located on a side of the first circuit daughterboard 14 away from the first sub-part 113*a* of the display device 113. The second part 02 may include a second sub-part 113*b* of the display device 113. On the side away from the display surface of the display device 113, the height of the first part 01 may be larger than the height of the second part 02.

In the present embodiment, the first circuit daughterboard 14 may be disposed on the first part 01 of the first body 11, corresponding to the first sub-part 113*a* of the display device 113, and the first interface 21 may be disposed on the side of the first circuit daughterboard 14 away from the display device 113. Therefore, a protrusion structure may be formed in a region of the outside of the first body where the first interface 21 is disposed. The protrusion structure may include the first interface 21, which is convenient for determining the position of the first interface 21.

Figure 5B:
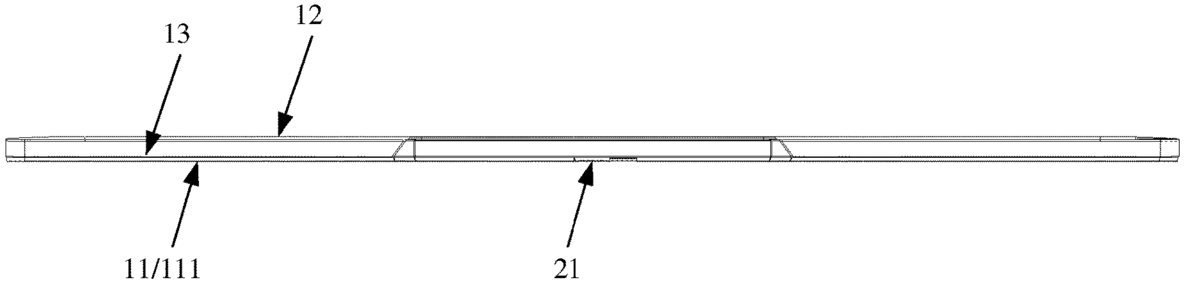
FIG. 5B is a side view of a first body and a second body facing a connection device when they are closed consistent with the present disclosure.

In some other embodiments, the structure of the first body 11 on the first side 111 may have a structure shown in FIG. 5B.

As shown in FIG. 5B, which is a side view of the first body and the second body which are closed facing the connection device, the first interface 21 may be flush with the first side 111 of the first body 11.

Figure 6:
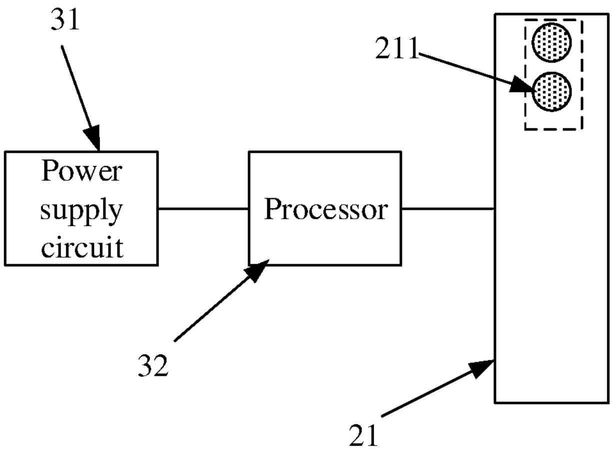
FIG. 6 is a schematic diagram of a circuit structure of an electronic device consistent with the present disclosure.

In one embodiment shown in FIG. 6, which is a circuit structure of an electronic device provided by the present disclosure, the electronic device may include a power supply circuit 31, and the power supply circuit 31 may be used to provide electric energy. The first external device may be electrically connected to the power supply circuit 31 through the first interface 21. The first interface 21 may include a plurality of power pins 211. The electronic device may further include a processor 32, and the processor 32 may be used to determine the power parameters required by the currently connected first external device, and control a portion of the plurality of power pins 211 with a quantity adapted to the power parameters to be connected to the power supply circuit 31.

In one embodiment, the first interface 21 may be configured to have two power pins 211, capable of outputting a maximum of 5V/4A power. In some other embodiments, the number of power pins 211 in the first interface 21 and the power parameters that can be output may be set based on requirements, which are not specifically limited in the embodiments of the present disclosure.

In the embodiment shown in FIG. 6, the first interface 21 may be able to match a variety of first external devices with different power parameter requirements, such that the first interface 21 may be able to provide the required power parameters for the currently electrically connected first external device when the first interface 21 are electrically connected to the first external device, ensuring the normal operation of the first external device.

Figure 7:
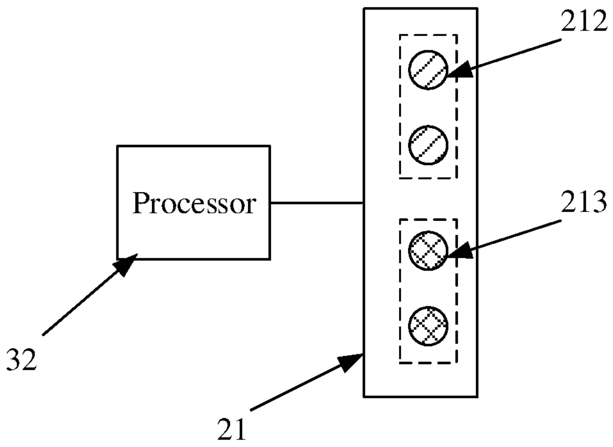
FIG. 7 is a schematic diagram of a circuit structure of another electronic device consistent with the present disclosure.

In one embodiment shown in FIG. 7, which is another circuit structure of the electronic device provided by the present disclosure, the first interface 21 may include signal pins 212 used for data interaction with the first external device when the first external device is electrically connected, and detection pins (ID Pin) 213 used for obtaining detection signals when the first external device is electrically connected. The electronic device may include a processor 32, and the processor 32 may control operation of other pins of the first interface 21 based on the detection signal obtained by the detection pins 213.

In one embodiment, an embedded controller (EC) in the electronic device may also be used as the processor 32.

The processor 32 may be able to determine whether the first interface 21 is electrically connected to the first external device based on the detection signal. In one embodiment, the processor may be able to determine whether the first interface 21 is electrically connected to the first external device by detecting voltage and/or current changes represented by the signal. When it is determined that the first external device is electrically connected, the other pins of the first interface may be enabled. When it is determined the first interface 21 is not electrically connected to the first external device, the other pins in the first interface 21 may be in a non-enabled state to reduce energy consumption. The other pins may include the signal pins 212.

In one embodiment, when the first interface 21 includes the signal pins 212 and the power pins 211, the other pins may include the signal pins 212 and the power pins 211.

In one embodiment, the first interface 21 may further include a ground pin, which is used to connect the ground terminal of the first external device when the first external device is electrically connected.

In the present disclosure, when the electronic device performs data interaction with the currently connected first electronic devices through the signal pins 212, the processor 32 may be able to obtain the identification information of the first electronic device based on the signal pins 212, and determine interaction information required by the first external device based on the identification information. The interaction information may include power parameters and/or communication protocols for data interaction required by the first external device.

The identification information may include first identification information, and the processor 32 may be able to determine the power parameters required by the currently connected first external device based on the first identification information, and then control a number of power pins 211 that match the power parameters to electrically connect the power supply circuit 31.

The identification information may include second identification information. Based on the second identification information, the processor 32 may be able to determine the communication protocol for data interaction required by the currently electrically connected first external device, and then control the signal pins 212 to be adapted to the communication protocol for performing data interaction with the first external device. In one embodiment, the signal pins 212 may include a plurality of USB pins. Different USB pins may be selected to perform data interaction with the electrically connected first external device based on the USB2.0 or USB3.0 communication protocol according to the control of the processor 32.

Figure 8:
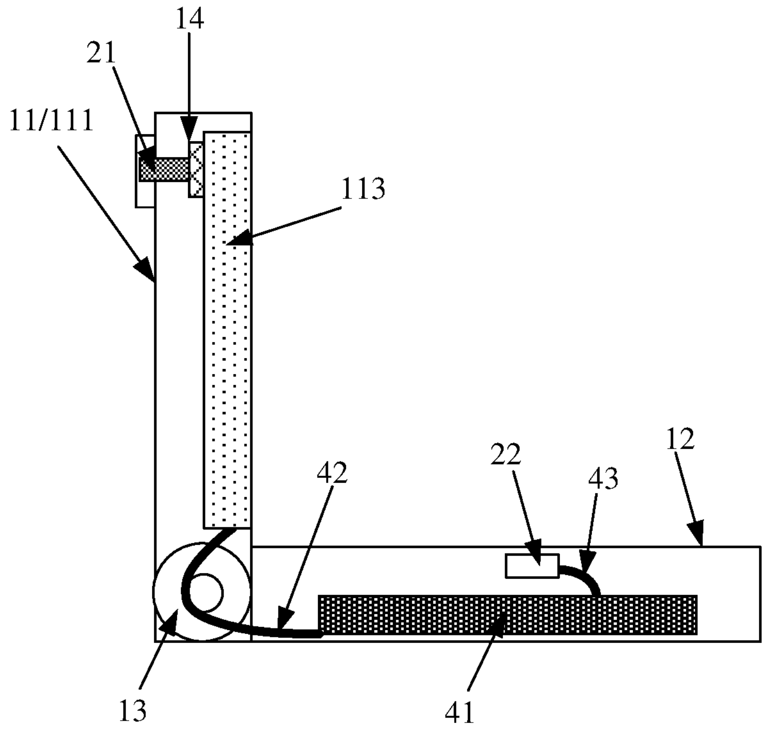
FIG. 8 is a schematic diagram of a circuit structure of another electronic device consistent with the present disclosure.

In one embodiment shown in FIG. 8, which is another circuit structure of the electronic device provided by the present disclosure, the second body 12 may include a circuit motherboard 41; and the display device 113 may be electrically connected to the circuit motherboard 41 through a first electrical connector 42. The second interface 22 may be connected to the circuit motherboard 41 through a second electrical connector 43. The first body 11 may include a first circuit daughterboard 14, and the first interface 21 may be electrically connected to the first circuit daughterboard 14. The first circuit daughterboard 14 may at least use the first electrical connector 42 to also electrically connect to the circuit mainboard 41.

The first electrical connector 42 may be a flexible circuit board (FPC) provided inside the electronic device. A portion of the flexible circuit board may be located in the first body 11 and the other portion may be located in the second body 12. One end of the flexible circuit board may be electrically connected to the circuit mainboard 41 and another end may be electrically connected to an end of the display device 113 close to the connecting device 13. The second electrical connector 43 may be located in the second body 12. In one embodiment, the second electrical connector 43 may be a welding structure used to weld and fix the second interface 22 to the circuit mainboard 41. In another embodiment, the second electrical connector 42 may be a flexible circuit board or a wire used to electrically connect the circuit mainboard 41 and the second interface 22.

In the embodiment shown in FIG. 8, at least the first electrical connector 42 may also be used for electrically connecting the first circuit daughterboard 14 and the circuit motherboard 41. Therefore, there may be no need to add a longer electrical connector to electrically connect the first circuit daughterboard 14 and the circuit motherboard 41.

The first electrical connector 42 may include a plurality of signal lines. A portion of the plurality of signal lines may be used to connect a display driver chip on the display device 113 and the circuit motherboard 41, such that the display driver chip is able to control the display device 113 to display images. Another portion of the plurality of signal lines may be used to connect the processor 32 and the first circuit daughterboard 14 in the circuit motherboard 113, such that the first interface 21 connected to the first circuit daughterboard 14 is electrically connected to the processor 32.

Figure 9:
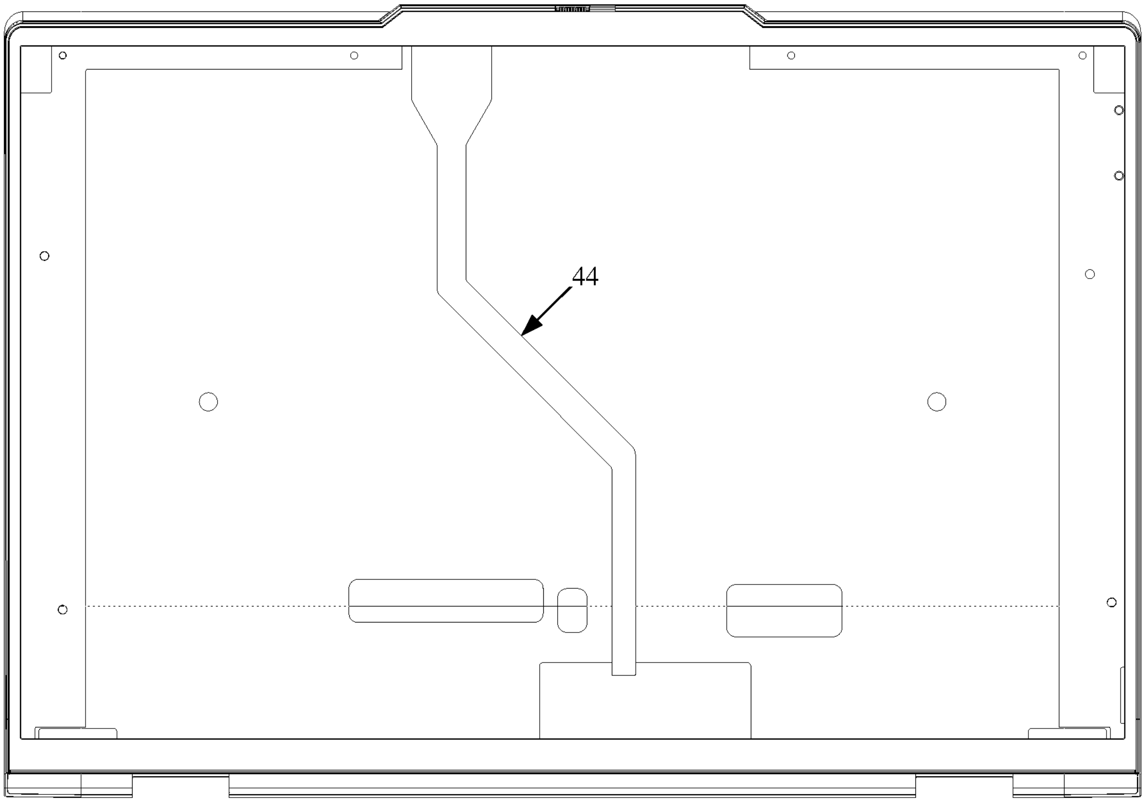
FIG. 9 is a schematic diagram of a circuit structure of another electronic device consistent with the present disclosure.

In one embodiment shown in FIG. 9 which is another circuit structure of the electronic device provided by the present disclosure, the electronic device may further include a third electrical connector 44 used to electrically connect the first circuit daughterboard 14 and the first electrical connector 42. The first circuit daughterboard 14 and the first electrical connector 42 are not shown in FIG. 9.

In one embodiment, the third electrical connector may be a flexible circuit board. In this manner, the first circuit daughterboard 14 and the circuit motherboard 41 may be electrically connected through the first electrical connector 42 and the third electrical connector 44. In comparison to the embodiment where the first circuit daughterboard 14 and the circuit motherboard 41 are electrically connected only through the third electrical connector 44, the length of the third electrical connector 44 may be shortened.

In another embodiment, the third electrical connector 44 may be configured as a signal line in the display device 113. The display device 113 may include a plurality of metal layers for producing display signal lines required for graphics display by the display device 113. In this manner, one of the plurality of metal layers existing in the display device 113 may also be used to form the third electrical connector 44 that connects the first electrical connector 42 and the first circuit daughterboard 14. Therefore, there may be no need to add additional electrical connectors separately.

In various embodiments, the first interface 21 and the first circuit daughterboard 14 may be directly soldered or electrically connected through a connector, and the connector may be a flexible circuit board or a wire.

Figure 10:
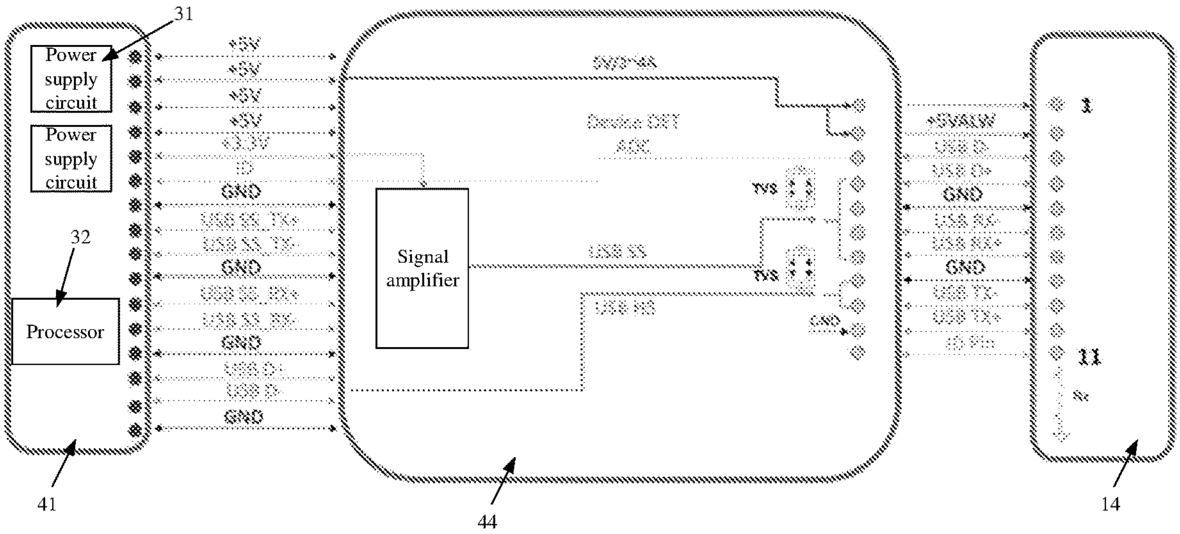
FIG. 10 is a schematic diagram of a circuit structure of another electronic device consistent with the present disclosure.

In one embodiment, the corresponding connection relationships between the pins of the connectors in the circuit motherboard 41, the third electrical connector 44, and the first circuit daughterboard 14 are shown in FIG. 10.

In one embodiment shown in FIG. 10, which is another circuit structure of the electronic device provided by the present disclosure, the circuit motherboard 41 may include a 16-pin flexible flat cable (FFC) or flexible circuit board. The processor 32 may be bonded to the circuit motherboard 41. The third electrical connector 44 may include a flexible circuit board connector (a Pogo FPC board), and the first circuit daughterboard 14 may include an 11-pin connector (Pogo).

A signal amplifier may be bonded to the third electrical connector 44 for amplifying the control signal output by the circuit motherboard 41. When the first interface 21 is connected to the first external device, the first external device may be controlled based on the amplified control signal. Although a circuit connection distance between the first interface and the circuit motherboard 41 is relatively large because of arranging the first interface 21 at an end of the first body 11 away from the first connection device 13, the signal amplifier may be provided to effectively reduce the problem of signal attenuation and realize the compatibility function of USB2.0 and USB3.0 through fewer signal pins 212.

The electronic device may be able to provide adapted power parameters for the currently electrically connected first external device based on the power supply circuit 31 on the circuit motherboard 41. In one embodiment, the electronic device may include two power supply circuits, respectively configured to provide 5V/3A power parameters and 5V/4A power parameters through corresponding power pins 211.

Figure 11:
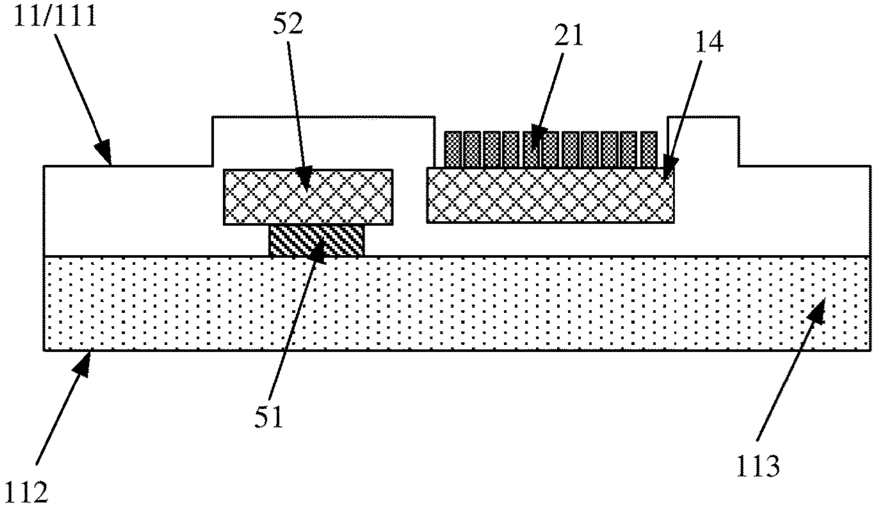
FIG. 11 is a schematic structural diagram of a first body consistent with the present disclosure.

In one embodiment shown in FIG. 11 which is a schematic diagram of a structure of the first body, the electronic device may include a light sensor 51 located in the first body 11, and the light sensor 51 may be electrically connected to a second circuit daughterboard 52 located in the first body 11. The first circuit daughterboard 14 and the second circuit daughterboard 52 may be both located on a side of the display device 113 away from the light-emitting side. The light sensor 51 may be located between the second circuit daughterboard 52 and the display device 113.

In the present embodiment, the electronic device may be able to realize the connection between the first interface 21 and the internal circuit of the electronic device through the first circuit daughterboard 14 and realize the connection between the light sensor 51 and the internal circuit of the electronic device through the second circuit daughterboard 52.

In one embodiment, the light sensor 51 may be a front-facing camera, configured to collect image information toward the light-emitting side of the display device 113. In another embodiment, the light sensor 51 may also be a light distance sensor, used to detect the distance of a target opposite to the light-emitting side of the display device 113.

The embodiment shown in FIG. 11 where the first circuit daughterboard 14 and the second circuit daughterboard 52 are two different circuit boards is used as an example to illustrate the present disclosure. The first circuit daughterboard 14 and the second circuit daughterboard 52 may meet a coplanar condition, that is, the first circuit daughterboard 14 and the second circuit daughterboard 52 may be located in a same plane or approximately located in a same plane.

In some other embodiments, the first circuit daughterboard 14 and the second circuit daughterboard 52 may be different parts of a same circuit board. The circuit board of the electronic device for bonding the light sensor 51 may also be used for bonding the first interface 21, and there may be no need to provide additional circuit board.

In the embodiment where the first circuit daughterboard 14 and the second circuit daughterboard 52 are different parts of a same circuit board and the embodiment where the first circuit daughterboard 14 and the second circuit daughterboard 52 are different circuit boards, the first circuit daughterboard 14 and the second circuit daughterboard 52 may meet a coplanar condition, to prevent the thickness of the first body 11 from being too large because of the non-coplanar setup.

In one embodiment, the electronic device may be a laptop computer. The first body 11 may be a display body and the second body 12 may be a keyboard body.

In a laptop computer in existing technologies, an interface for connecting external devices is generally provided only on the keyboard body. For example, a USB interface is provided on the keyboard body for data communication and power supply with external devices. In laptop computers in existing technologies, the interface position is fixed and is generally set on the side wall of the keyboard body. Further, considering the thickness, design complexity and product competitiveness of the product, laptop computers in existing technologies generally do not integrate high-power speakers and high-image-quality cameras. If there are a need to connect external devices such as speakers or cameras, because of the limited space on the side wall of the keyboard body, the external devices need to be connected to the interface of the keyboard body through USB data cables.

In the present disclosure, the second body 12 may be used to place the electronic device on the carrying surface, and the first interface 21 may be provided on the side of the first body 11 away from the display side of the display device 113. Therefore, the number of interfaces in the electronic device may be increased, and there may be a large space on the first body 11 to plug in the first external device through the first interface 21 without being limited by the space between the first body 11 and the load-bearing surface, when the first body 11 is opened and used relative to the second body 12. Further, the first external device may be directly electrically connected to the first interface 21 through its own port, and the connection between the first external device and the first interface 21 may not require a data cable.

Figure 12:
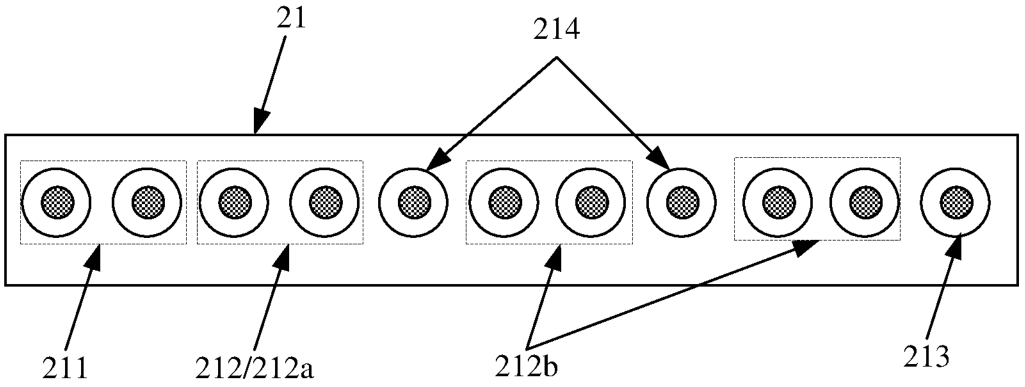
FIG. 12 is a top view of a first interface of an electronic device consistent with the present disclosure.

In one embodiment shown in FIG. 12, which is a top view of the first interface of the electronic device, the first interface 21 may include 11 pins. The 11 pins may include: two power pins 211; 6 signal pins 212; 2 ground pins 214; and a detection pin 213. Two signal pins 212 of the 6 signal pins may be USB2.0 pins 212*a*, and other four signal pins 212 of the 6 signal pins may be USB3.0 pins 212*b*.

The first interface 21 may include the USB2.0 pins 212*a* and the USB3.0 pins 212*b*, and may be able to be compatible with the communication protocols of USB2.0 and USB3.0 at the same time. The first interface 21 may be able to provide a data transmission speed of up to 5 Gbps. By providing two power pins 211, a power supply of up to 20 W (5 W/4A) may be provided to the first external device.

The plurality of pins of the first interface 21 may be arranged in a linear array in sequence, and the arrangement direction may be parallel to the opposite sides of the first body 11 and the second body 12. The embodiments here are used as examples only to illustrate the present disclosure, and do not limit the scope of the present disclosure. In various embodiments, the arrangement of the pins in the first interface 21 and the number of various pins may be set based on requirements, and are not limited to the implementation shown in FIG. 12. For example, in some other embodiments, the first interface 21 may be set to include 5 pins or 6 pins.

In one embodiment, the first interface 21 may include 6 pins, and the 6 pins may be set to include: 2 power pins; 2 signal pins 212, a ground pin, and a detection pin. The 2 signal pins 212 may be USB2.0 pins. In this case, there may be two power pins. As described in the above embodiments, one or two power pins may be selected to provide power based on needs to provide different power supplies.

In another embodiment, the first interface 21 may include 5 pins, and the 5 pins may be set to include: 1 power pin; 2 signal pins 212, a ground pin, and a detection pin. The 2 signal pins 212 may be USB2.0 pins. In this case, there may be a power pin that provides a fixed power supply.

As mentioned above, in the present disclosure, the first external device may be fixedly connected to the second end of the first body 11 through the first interface 21. When the first body 11 and the second body 12 are opened at a set angle, and the electronic device is placed on the surface of the bearing object (such as the surface of a desk) through the second body 12, the first external device may be fixedly connected to the top of the first body.

The first external device may be a camera used to collect images facing the display side of the display device 113. By fixedly connecting the camera to the second end of the first body 11 through the first interface 21, the camera may have a better relative height position relationship with the user and have a better horizontal viewing angle to facilitate image collection.

The first external device may also be a fill light, which is used to supplement light when the front camera integrated in the electronic device itself is imaging to improve imaging quality. Generally, the front camera of the electronic device may be set at the second end of the first body 11, and the fill light may be fixedly connected to the second end of the first body 11 through the first interface 21, such that the fill light and the front camera of the electronic device itself are located at the second end of the first body to achieve a better light filling effect.

The first external device may also be an auxiliary antenna for improving the wireless communication capability of the electronic device. The auxiliary antenna may be fixedly connected to the second end of the first body 11 through the first interface 21, such that the auxiliary antenna has a better radiation environment and is away from the interference of metal components in the first body, to achieve all-round interference-free signal transmission and reception on the horizontal plane.

In the electronic device provided by the present disclosure, by arranging the first interface 21 in the first body 11, the electronic device may have more interfaces for connecting external devices, such that the electronic device has more scalability. Compared with a manner increasing the number of interfaces in the second body 12, the design solution may not need to change the circuit structure of the second body 12, simplifying the system design. The electronic device may be directly connected and fixed with the first external device based on the first interface 21 without the need for data cable connection, thus avoiding the complexity of wire connection. The first interface 21 may be directly integrated with the first body 11 by design, to have a high system integration level.

The electronic device may be able to connect to more types of external devices through the first interface 21, and may be able to provide users with more application scenario support and may be easy to use. Further, the electrical connection method between the first external device and the first interface 21 of the electronic device may be simple, without the need for data cables of different interface types, and the device may have good portability.

In the present disclosure, the first external device may be a camera, a lighting source, a 4G module, or a three-in-one integrated device of a camera, a microphone, and a light source (a fill light for the camera or an ambient light).

Figure 13:
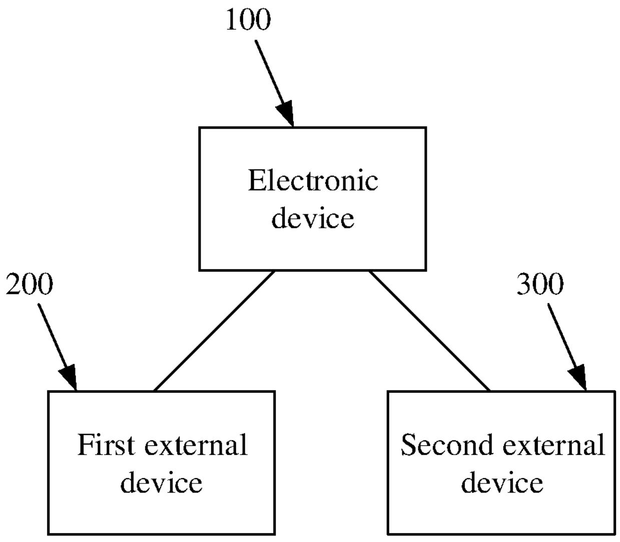
FIG. 13 is a schematic structural diagram of an electronic system consistent with the present disclosure.

The present disclosure also provides an electronic system. As shown in FIG. 13, in one embodiment, the electronic system may include an electronic device 100, a first external device 200 able to be connected to a first interface 21 of the electronic device, and/or a second external device 300 able to be connected to a second interface 22 of the electronic device 100. For the implementation of the electronic device 100, the reference may be made to the above embodiments.

The electronic device 100 may include: a first body 11 having a first side 111 and a second side 112 opposite to each other; the first interface 21 provided on the first body 11; a display device 113 provided on the first body 11 and exposed through the second side 112 for outputting display content; a second body 12 connected to the first body 11 through a connection device 13 and able to move relative to the first body 11; and the second interface 22 provided on the second body 12.

In the electronic system, the electronic device 100 may be only connected to the first external device 20 through the first interface 21, or may be only connected to the second external device 300 through the second interface 22, or may be connected to the first external device 20 through the first interface 21 and connected to the second external device 300 through the second interface 22.

The first interface 21 may be configured to be directly and electrically connected to the first external device 200 without the need for a data cable. The second interface 22 may be configured to be electrically connected to the second external device 300 through a data cable.

The first external device 200 may include a first port which is compatible with the first interface 21 and may be used for electrical connection with the first interface 21. The first external device 200 may also be configured to include a first port which is compatible with the second interface 22 and may be used to electrically connect with the second interface 22, such that the first external device 200 may not only be able to be electrically connected with the electronic device 100 through the first interface 21, but also be able to be electrically connected with the electronic device 100 through the second interface 22.

In one embodiment, the electronic system may include at least two different first external devices 200, and each of the at least two first external devices 200 may include a first port capable of connecting to the first interface 21. Correspondingly, different first external devices 200 may be connected to the electronic system based on selection. For example, the first interface 21 may be connected to a camera, a lighting source, a 4G module (such as a network card), or an integrated device of a camera, a microphone, and a light source, based on requirements.

When the electronic device 100 detects that one first external device 200 with the first function is connected to the first interface 21, and when the electronic device 100 integrates a functional component with the first function, the processor 32 in the electronic device 100 may enable one of the functional components and the first external device 200, and disable another one, through the first interface 21. For example, the one with better first function may be selected to be enabled, leaving another in a non-enabled state. Correspondingly, the electronic device may be able to automatically select one of the functional components and the first external device 200 to be enabled through the processor 32, and make the other one in a non-enabled state. Or, in response to an input instruction, the electronic device may be able to select one of the functional components and the first external device 200 to be enabled through the processor 32, and make the other one in a non-enabled state based on the input instruction.

When the electronic device 100 detects that one first external device 200 with the first function is connected to the first interface 21, and when the electronic device 100 does not integrate a functional component with the first function, the processor 32 in the electronic device 100 may enable the first external device 200 through the first interface 21, to achieve the first function expansion through the first external device 200 electrically connected to the first interface 21.

After the electronic device 100 is powered on, the internal processor 32 may perform a self-check to determine whether each pin in the first interface 21 is normal. When each pin is normal, the detection information may be obtained through the detection pin 213 in the first interface 21 to determine whether the first external device 200 is connected to the first interface 21. When the first external device 200 is not connected to the first interface 21, the pins in the first interface 21 may be placed in a sleep state to reduce energy consumption. After putting the pins in the first interface 21 in a sleep state, the processor 32 may periodically detect whether the first external device 200 is connected to the first interface 21 based on set conditions.

When detecting that the first external device 200 is connected to the first interface 21, the processor 32 may also determine whether the first external device 200 is compatible with the USB2.0 communication protocol or the USB3.0 communication protocol, and select the compatible signal pins 212 to perform data interaction with the first external device 200 based on the determination result. When it is determined that the first external device 200 is compatible with the USB 2.0 communication protocol, data interaction may be performed with the first external device 200 through the USB 2.0 pins 212*a*. When it is determined that the first external device 200 is compatible with the USB3.0 communication protocol, data interaction may be performed with the first external device 200 through the USB3.0 pins 212*b*.

The processor 32 may determine whether the first external device 200 is compatible with the USB2.0 communication protocol or the USB3.0 communication protocol based on the identification information. In some other embodiments, when it is determined that the first external device 200 is connected, data interaction may be performed with the first external device 200 through the USB2.0 pins 212*a* and the USB3.0 pins 212*b* at the same time, and, it may be determined that whether the first external device 200 is compatible with the USB2.0 communication protocol or the USB3.0 communication protocol based on the communication result.

The processor 32 may also be able to identify whether the currently connected first external device 100 is connected to other first external devices 100. When the first external device 100 currently connected with the first body 11 is connected other first external devices 100, power supply or data interaction may be performed with the other first external devices 100 based on the first external device 100 currently connected to the first body 11. In this manner, the first external device 100 may include a third interface for detachably connecting the other first external devices 100. When the first external device 100 is connected to the electronic device through the first interface 21 on the first body 11, the electronic device may be able to provide power to the other first external devices 100 through the first external device 100 currently connected to the first body 11, and/or perform data interaction with the other first external devices 100 to control the working status of the other first external devices 100.

For example, in one embodiment, the currently connected first external device 100 may be a camera, and the camera may be connected to a fill light through a third interface. The electronic device may provide power to the fill light through the camera and control the fill light. When images are collected through the camera and there is a need for supplementary light, the fill light may be controlled to perform imaging supplementary light.

Optionally, the third interface may be the same as the first interface. In this case, when one first external device 100 is connected and fixed to the first body 11 of the electronic device, on the first external device 100 currently connected to the first body, other first external devices 100 may be further connected through the third interface of the first external device 100 currently connected to the first body.

When the first external device 100 is fixedly connected to the electronic device through the first interface 21 of the first body 11, the first port connected to the first external device 100 and the first body 11 may face the first side 111. When the first external device 100 is set to be fixedly connected to the electronic device through the first interface 21 of the first body 11, the third interface on the first external device 100 may facing the first end from the second end of the first body 11, such that the other first external devices 100 are located above the first external device 100 currently connected to the first body 11 when the other first external devices 100 are fixedly connected to the electronic device through the first external device 100 currently connected to the first body 11, to ensure the connection stability of the other first external devices 100 and the first external device 100 currently connected on the first body 11.

Embodiments in this specification are described in a progressive manner, and each embodiment focuses on the difference from other embodiments. Same and similar parts of the embodiments may refer to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, panels, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this article, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element defined by the statement "comprises a . . . " does not exclude the presence of other identical elements in an article or device that includes the above-mentioned element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An electronic device comprising:

a first body, including a first side and a second side opposite to each other;

a first interface, disposed at the first body and configured to electrically connect to a first external device;

a display device, disposed at the first body and exposed through the second side;

a second body, connected to the first body through a connection device and configured to move relative to the first body; and a second interface, disposed at the second body and configured to electrically connect to a second external device;

wherein the first body includes:

a first part including:

a first sub-part of the display device;

a circuit daughterboard located on a side of the first sub-part of the display device away from a light-emitting side; and the first interface on a side of the circuit daughterboard away from the first sub-part of the display device; and a second part including a second sub-part of the display device, on a side facing away from a display surface of the display device, a height of the first part being greater than a height of the second part.

2. The electronic device according to claim 1, wherein:

the first body further includes a first end and a second end opposite to each other;

the first end is rotatably connected to one end of the second body through at least part of the connection device; and the first interface is disposed at the second end and exposed through the first side.

3. The electronic device according to claim 2, wherein:

the at least part of the connection device includes a first connection device;

the first body further includes a second connection device configured to detachably fix the first external device; and the first interface is configured to be electrically connected to the first external device in response to the first external device being fixed to the electronic device through the second connection device.

4. The electronic device according to claim 1, further comprising:

a power supply circuit configured to provide electrical power; and a processor;

wherein:

the first interface is configured to electrically connect the first external device to the power supply circuit;

the first interface includes a plurality of power pins; and the processor is configured to determine power parameters required by the first external device and control one or more of the plurality of power pins matching the power parameters to be connected to the power supply circuit.

5. The electronic device according to claim 1, further comprising:

a processor;

wherein:

the first interface includes:

a signal pin configured to perform data interaction with the first external device when the first external device is electrically connected to the first interface; and a detection pin configured to obtain a detection signal when the first external device is electrically connected to the first interface; and the processor is configured to control working status of one or more other pins of the first interface based on the detection signal.

6. The electronic device according to claim 1, wherein:

the second body includes a circuit motherboard;

the display device is electrically connected to the circuit motherboard through a first electrical connector;

the second interface is electrically connected to the circuit motherboard through a second electrical connector;

the first interface is electrically connected to the circuit daughterboard; and the circuit daughterboard is electrically connected to the circuit motherboard at least through the first electrical connector.

7. The electronic device according to claim 6, wherein the circuit daughterboard is a first circuit daughterboard;

the electronic device further comprising:

a light sensor in the first body and electrically connected to a second circuit daughterboard of the first body;

wherein:

the first circuit daughterboard and the second circuit daughterboard are both located on a light-emitting side away from the display device.

8. An electronic system comprising:

an electronic device, including:

a first body, including a first side and a second side opposite to each other;

a first interface, disposed at the first body;

a display device, disposed at the first body and exposed through the second side;

a second body, connected to the first body through a connection device and configured to move relative to the first body; and a second interface, disposed at the second body; and a first external device configured to be connected to the first interface and/or a second external device configured to be connected to the second interface;

wherein the first body includes:

a first part including:

a first sub-part of the display device;

a circuit daughterboard located on a side of the first sub-part of the display device away from a light-emitting side; and the first interface on a side of the circuit daughterboard away from the first sub-part of the display device; and a second part including a second sub-part of the display device, on a side facing away from a display surface of the display device, a height of the first part being greater than a height of the second part.

9. The electronic system according to claim 8, wherein:

the first external device is one of at least two different first external devices of the electronic system, and each of the at least two different external devices includes a port configured to be connected to the first interface.

10. The electronic system according to claim 8, wherein:

the first body further includes a first end and a second end opposite to each other;

the first end is rotatably connected to one end of the second body through at least part of the connection device; and the first interface is disposed at the second end and exposed through the first side.

11. The electronic system according to claim 10, wherein:

the at least part of the connection device includes a first connection device;

the first body further includes a second connection device configured to detachably fix the first external device; and the first interface is configured to be electrically connected to the first external device in response to the first external device being fixed to the electronic device through the second connection device.

12. The electronic system according to claim 8, wherein:

the electronic device further includes:

a power supply circuit configured to provide electrical power; and a processor;

the first interface is configured to electrically connect the first external device to the power supply circuit;

the first interface includes a plurality of power pins; and the processor is configured to determine power parameters required by the first external device and control one or more of the plurality of power pins matching the power parameters to be connected to the power supply circuit.

13. The electronic system according to claim 8, wherein:

the electronic device further includes a processor;

the first interface includes:

a signal pin configured to perform data interaction with the first external device when the first external device is electrically connected to the first interface; and a detection pin configured to obtain a detection signal when the first external device is electrically connected to the first interface; and the processor is configured to control working status of one or more other pins of the first interface based on the detection signal.

14. The electronic system according to claim 8, wherein:

the second body includes a circuit motherboard;

the display device is electrically connected to the circuit motherboard through a first electrical connector;

the second interface is electrically connected to the circuit motherboard through a second electrical connector;

the first interface is electrically connected to the circuit daughterboard; and the circuit daughterboard is electrically connected to the circuit motherboard at least through the first electrical connector.

15. The electronic system according to claim 14, wherein:

the circuit daughterboard is a first circuit daughterboard;

the electronic device further includes a light sensor in the first body and electrically connected to a second circuit daughterboard of the first body; and the first circuit daughterboard and the second circuit daughterboard are both located on a light-emitting side away from the display device.

16. An electronic device comprising:

a first body, including a first side and a second side opposite to each other;

a first interface, disposed at the first body and configured to electrically connect to a first external device;

a display device, disposed at the first body and exposed through the second side;

a second body, connected to the first body through a connection device and configured to move relative to the first body; and a second interface, disposed at the second body and configured to electrically connect to a second external device;

wherein:

the second body includes a circuit motherboard;

the display device is electrically connected to the circuit motherboard through a first electrical connector;

the second interface is electrically connected to the circuit motherboard through a second electrical connector;

the first body includes a circuit daughterboard;

the first interface is electrically connected to the circuit daughterboard; and the circuit daughterboard is electrically connected to the circuit motherboard at least through the first electrical connector.

* * * * *